United States Patent

[11] 3,617,237

[72] Inventors Shigeru Nagasawa;
        Tsuneaki Nakano; Kunio Sakashita, all of
        Sunagawa, Japan
[21] Appl. No. 887,770
[22] Filed Dec. 23, 1969
[45] Patented Nov. 2, 1971
[73] Assignee Mitsui Toatsu Chemicals, Incorporated
        Tokyo, Japan
[32] Priority Jan. 21, 1969
[33] Japan
[31] 44/3770

[54] PROCESS FOR PRODUCING GRANULAR COMPOUND FERTILIZER
10 Claims, No Drawings
[52] U.S. Cl. .................................................. 71/24,
        23/313, 71/64 D, 71/64 DA
[51] Int. Cl. ........................................... C05f 11/02

[50] Field of Search ............................................ 71/23, 24,
        64 DA, 64 D; 23/313; 264/117

[56] References Cited
UNITED STATES PATENTS
3,307,934   3/1967   Palmer et al .................   71/24

Primary Examiner—Reuben Friedman
Assistant Examiner—Richard Barnes
Attorney—Christen & Sabol ABSTRACT: Improved process for producing granular compound fertilizer comprising mixing humic substance separated from peat with a mixture of starting fertilizer materials, and granulating by tumbling, kneading or extruding the resulting mixture to form the granular compound fertilizer. The humic substance is obtained by disintegrating peat in water to suspend said humic substance and fibrous substance in the water and separating said humic substance from the suspension.

PROCESS FOR PRODUCING GRANULAR COMPOUND FERTILIZER

This invention relates to an improvement in the production of granular compound fertilizer.

Generally, in the production of inorganic granular compound fertilizers from starting fertilizer materials such as ammonia, ammonium sulfate, ammonium nitrate, urea, calcium superphosphate, ammonium phosphates, potassium phosphates, potassium chloride, potassium sulfate and others, it has been usual to use a batch system or continuous system comprising a combination of steps such as the crushing, weighing, mixing, and ammoniating of the starting fertilizer materials, granulation of the resulting mixture, drying and sieving of the formed granules and recycling of undersized and oversized granules and bagging the product.

The most important objectives in such process are to develop the maximum production capacity from the equipment and to produce a high quality product which is uniform in the proportions of components such as nitrogen, phosphorus, potassium and other elements. In order to achieve these objectives, it is very important to elevate the granulation ratio (the dry weight percentage of granular fertilizer having the desired size in the material after drying but before sieving) and to reduce the amount of adhesion of the granules to the dryer wall. When the granulation ratio is too low, the amount of charge of starting fertilizer materials is reduced because of the need to recycle increased amounts of undersized and oversized granules. Thus, the production capacity drops steeply and the amount of water to be evaporated in the dryer increases per unit weight of acceptable product. A reduction of granulation ratio is not only uneconomical but also causes deviations in the composition of the product.

The adhesion of the granules to the dryer wall in the drying step not only reduces the inherent drying capacity but also results in a product of nonuniform composition. According to the results of investigations, the substance sticking to the dryer wall contains disproportionately high amounts of low melting point substances such as urea and ammonium nitrate and, in the product at the outlet of the dryer, the amount of each such components is significantly less than the amount in the charging rate of the starting materials. This tendency is particularly striking in high analysis compound fertilizers the demand for which has been increasing recently. In order to prevent sticking, some compound fertilizers must be dried at low temperatures and the production capacity therefore drops exceedingly.

An object of this invention is to provide a process of producing granular compound fertilizers characterized by high granulation ratios.

Another object of this invention is to provide a process of producing granular compound fertilizers without the adhesion of fertilizer materials to the dryer wall in the drying step.

According to the present invention, there is provided a process for producing granular compound fertilizers which comprises mixing humic substance obtained from peat (such as grass peat and forest peat) with a mixture of the starting fertilizer materials, and granulating by tumbling, kneading or extruding the thus-obtained mixture to form a granular compound fertilizer. The humic substance is obtained by disintegrating peat in water to suspend the humic substance and the fibrous substance in the water and separating the humic substance from the suspension.

There are already known many processes for producing fertilizers by using peat. However, in each of them, peat is used as it is, or its alkali-treated substance, or alkali extract, is used. None of these processes are known to have any favorable influence on the granulation ratio and adhesion of granules to dryer wall.

It has been found to be most effective to use, as a substance to attain the object of the present invention, the humic substance obtained by disintegrating peat in water to suspend the fibrous component and the humic substance in the water and separating the humic substance contained in the suspension by centrifugal separation or any other method after removing the fibrous substance with a screen.

Illustratively, the humic substance is obtained in the following manner. A pump dredger is placed on the peat bed after the surface soil has been removed, for example, with a drag line. The peat is cut into small blocks with the cutter mounted on the pump dredger. The peat blocks are conveyed to the upper part of the dredger between cutter and its shaft. The small blocks are then sucked into a pump together with the water in the peat layer and are agitated by the impeller of the pump to disintegrate the blocks into a suspension of the fibrous and humic substances. At the same time, the peat and water are hydraulically conveyed to a suitable location for further treatment. Usually the peat is well disintegrated in the pump. However, if necessary or desired, a beater can be provided before or after the pump to beat the peat and further disintegrate it into the fibrous and humic substances. When hydraulic conveyance is used, the concentration of peat (all solid components) in water is preferably about 1 to about 5 percent by weight. The slurry containing the fibrous and humic substances, which is essentially nonfibrous, is separated into the solid fibrous substance containing 80 to 90 percent by weight of water and an aqueous humic suspension containing 0.5 to 5 percent humic substance by means of a screen of suitable mesh size, for example, of about 0.5 to about 5 mm. The humic substance suspension having passed through the screen is introduced into a precipitating pool and is recovered as cakes, for example, having a water content of about 80 percent by suitable means such as a super decanter or Oliver filter. The separated humic substance having particle diameters in the range of about 10 to about 1,000 microns is dried to a water content of about 50 percent. Further details of procedures for separating the humic substance from peat are given in copending application Ser. No. 627,438, filed Mar. 31, 1967 incorporated herein by reference.

The starting fertilizer materials are well known and contain at least two inorganic fertilizer materials selected from the group consisting of nitrogen fertilizer materials, phosphorus fertilizer materials and potassium fertilizer materials. Examples of nitrogen fertilizer materials are urea, ammonium nitrate, ammonium sulfate and ammonia (including gaseous ammonia, liquid ammonia and aqueous solutions of ammonia). Examples of phosphorus fertilizer materials include phosphoric acid, ammonium phosphates, calcium superphosphate, triple superphosphate and potassium phosphates. Potassium sulfate, potassium chloride and potassium nitrate are examples of potassium fertilizer materials. The mixture of the starting fertilizer materials may contain a magnesium component such as magnesium hydroxide, and other minor elements such as zinc, iron, manganese and molybdenum in the form of their salts. This invention can be used in the manufacture of any of the many well known granular fertilizers to provide the advantages of improved granulation ratio and reduced adhesion of the dryer walls. These and other materials are disclosed for example, in Industrial Chemistry by E. R. Riegel, pp. 147–162, 1949 Reinhold Publishing Corporation, New York, N.Y. Artificial Fertilizers by Parrish and Ogilvie, 1927, Van Nostrand Company, New York, N. Y; and Manual of Industrial Chemistry by Rogers, pp. 481–511, 1926, Van Nostrand Company, incorporated herein by reference. The types and amounts of each such material to be used in making the granular fertilizer depends on the type of fertilizer desired and the use to which it is to be put and are well known.

The humic substance is preferably added to the fertilizer materials prior to granulation and is added in an amount of at least about 1 dry weight percent, preferably at least about 3 dry weight percent, especially about 3 to about 30 dry weight percent, based on the dry weight of the total resulting mixture including the humic substance and fertilizer materials.

Granulation of the mixture of the starting fertilizer materials is conducted by tumbling, kneading or extruding it in the presence of a suitable amount of water, using any of the various known methods described in, for example, Kirk-Othmer; "Encyclopedia of Chemical Technology," second Edition, Vol. 9, pages 12 to 132. The mixture may be dry or in an aqueous slurry. The water present in the mixture is preferably about 5 to about 30 percent by weight. The granulation temperature is preferably lower than about 70° C.

The following examples are presented in which all parts and percentages are on a weight basis and temperatures are on the Centigrade scale unless otherwise designated.

EXAMPLE 1

A high quality peat (having a weight ratio of fibrous substance to humic substance of 6 : 4) collected in the Sarobetsu plain in Hokkaido, Japan, was beaten in water to form a suspension containing the fibrous substance and humic substance. The fibrous substance was separated from the suspension with a 20-mesh screen. The remaining suspension containing humic substance was centrifuged to separate the solid humic substance. The humic substance thus obtained was dried to a water content of 50 percent and was sieved with a 1,000-micron sieve and all that part of it passing through the sieve was recovered and used below as an additive.

The same high quality peat was dried as it was to a water content of 50 percent and was crushed and all that part of it passing through the 1,000-micron sieve was recovered and used below as an additive for comparison.

Amounts of 30 to 500 parts of each of the above-mentioned additives were added to the total of 817 parts of a mixture containing 133 parts of urea, 172 parts of ammonium sulfate, 233 parts of monoammonium phosphate, 43 parts of calcium superphosphate, 209 parts of potassium chloride and 27 parts of magnesium hydroxide. A total of 1 kg. of the mixed raw materials was put into a pan granulator having a diameter of 45 cm. and a mixing rate of 32 revolutions per minute and was rotated for 10 minutes while spraying water to granulate the materials. The granulation ratio was determined by measuring the weight percentage of granules having a grain size falling in the range of about 1.3 to about 3.5 mm.

In addition, the process was repeated but instead of sieving the granular material after granulation it was fed together with heated air at an inlet temperature of 250° C. into a cylindrical rotary drum dryer having a diameter of 30 cm., and a length of 1 meter and rotating at 15 revolutions per minute. The amount of fertilizer material adhering on the dryer wall was measured and its state was observed.

In addition, for comparison, peat as such and the aforementioned fibrous substance separated from the suspension containing humic and fibrous substances were also tested separately. The advantages of the process of the present invention and the results of the comparisons are shown in table I. Each of the additives contained 50 percent by weight of water. The adhesion ratio is the weight percentage of fertilizer materials which adheres to the dryer wall based on the total weight of fertilizer materials fed through the dryer.

The following advantages are obtained according to the present invention. First the granulation ratio of the compound fertilizer is increased and the adhesion of granules to the dryer wall in the drying step is substantially reduced. Second, the granular compound fertilizer obtained by the process of the present invention is very high in storability and does not coagulate even when it is stored for long periods of time. Third, sterilization of soil is prevented by applying the compound fertilizer of the present invention which contains the humic substance and an acceleration of the growth of crops and increase in the fertilizing effect by the combination of the fertilizer and humic substance is observed.

EXAMPLE 2

251 kg. of urea, 62 kg. of ammonium sulfate, 210 kg. of monoammonium phosphate, 290 kg. of potassium sulfate, 27 kg. of magnesium hydroxide, 240 kg. of humic substance obtained by disintegrating peat in water and separating from the suspension having the fibrous substance removed by filtering with a 20 mesh screen and crushed and dried to a water content of 50 percent and grain size of less than 1,000 microns and 250 kg. of a mixture (which shall be briefly called the recycled mixture hereinafter) of crushed oversized granules and undersized granules obtained in a later step per ton of the product were mixed together and were continuously fed at a rate of 672 kg. per hour into a rotary drum type ammoniating granulator of a diameter of 0.9 meter and length of 1.8 meters wherein 7 kg./hr. of liquid ammonia were added to said fertilizer mixture. Then this mixture was fed to a dish-shaped granulator of a diameter of 1.6 meters and was granulated while spraying water so that the water content at the outlet of the granulator was about 20 percent. The resulting granules were then fed into a rotary dryer of a diameter of 1 meter and length of 10 meters and was dried with hot air having an inlet temperature of 250° C. to obtain 500 kg./hr. of a granular product.

The granulation ratio (the weight percentage of the granules having 1.3 mm. to 3.5 mm. diameter in the product at the outlet of the dryer) was so high as to be 75 percent, the recycling ratio R/N (wherein R is the weight of dry recycled mixture and N is the weight of the dry mixture of raw materials) was only 0.25. No adhesion at all to the inside wall of the dryer was observed.

The product contained 16 percent of nitrogen, 10 percent of phosphorus ($P_2O_5$), 14 percent of potassium ($K_2O$) and 1 percent magnesium (MgO). On the other hand, when it was produced in the same manner from the same raw materials without the humic substance, under the same conditions, the granulation ratio was only about 25 percent and the adhesion of granules to the inside wall of the dryer occurred at a rate of about 100 kg. per hour and the operation became impossible within 5 hours.

TABLE I

| | No. | Kind of additive | Amount in parts of additive* | Granulation ratio, percent | Ease of granulation | Adhesion ratio, percent | State of adhesion of granules of the dryer wall |
|---|---|---|---|---|---|---|---|
| Comparison | 1 | Peat as such | 80(4.67%) | 32.5 | Small granules were so many that it was difficult to granulate the mixture. | 12.6 | Rather little. |
| | 2 | ___do___ | 300(15.5%) | 27.6 | ___do___ | 8.3 | Little. |
| Invention | 3 | Humic substance separated from peat. | 30(1.8%) | 38.1 | It was rather easy to granulate the mixture. | 3.8 | Substantially no adhesion. |
| | 4 | ___do___ | 80(4.67%) | 54.3 | The grain size was so uniform that it was easy to granulate the mixture. | 1.5 | Do. |
| | 5 | ___do___ | 150(8.4%) | 66.9 | ___do___ | 1.2 | Do. |
| | 6 | ___do___ | 300(15.5%) | 72.5 | ___do___ | 1.3 | Do. |
| | 7 | ___do___ | 500(23.4%) | 71.8 | ___do___ | 1.2 | Do. |
| Comparison | 8 | Fibrous substance separated from peat. | 80(4.67%) | 27.6 | Small granules were so many that it was difficult to granule the mixture. | 17.8 | Rather little. |
| | 9 | ___do___ | 300(15.5%) | 18.8 | Substantially not granulated. | 16.5 | Do. |
| | 10 | No additive | 0 | 33.4 | Granules tended to become too large. | 27.1 | Much stuck in the part 40, cm. from the inlet. |

*Percentages in parenthesis are percentages of additives in the total mixture of fertilizer materials and additive on a dry basis.

EXAMPLE 3

224 kg. of ammonium sulfate, 330 kg. of monoammonium phosphate, 250 kg. of potassium sulfate, 27 kg. of magnesium hydroxide, 240 kg. of humic substance, obtained by the same method as described in example 2 and crushed and dried to a water content of 50 percent and grain size of less than 1,000 microns, and 200 kg. of a recycle mixture obtained in a later step per ton of the product were mixed together and were continuously fed at the rate of 647 kg. per hour into a rotary drum type ammoniating granulator of a diameter of 0.9 meter and length of 1.8 meters wherein 12 kg./hr. of liquid ammonia were added to said fertilizer mixture. Then, this mixture was fed to a dish-shaped granulator of a diameter of 1.6 meters and was granulated while spraying water so that the water content at the outlet of the granulator was about 23 percent.

The granules obtained were fed into a rotary dryer of a diameter of 1 meter and length of 10 meters and were dried with hot air having an inlet temperature of 450° C. to obtain 500 kg./hr. of a granular product. The granulation ratio was so high as to be 80 percent, the recycling ratio was only 0.20. No adhesion at all of granules to the inside wall of the dryer was observed. The obtained product contained 10 percent of nitrogen, 16 percent phosphorus ($P_2O_5$), 12 percent of potassium ($K_2O$) and 1 percent of magnesium (MgO).

On the other hand, when it was produced in the same manner from the same raw materials without the humic substance, under the same conditions, the granulation ratio was only about 35 percent and about 50 kg./hr. of the granules were stuck on the inside wall of the dryer.

What is claimed is:

1. In a process for producing granular compound fertilizers wherein a mixture of granulatable fertilizer materials is granulated to form a granular compound fertilizer, that improvement which comprises conducting the granulation of said mixture in the presence of humic substance obtained by disintegrating peat in water to suspend the humic substance and fibrous substance in the water and separating the humic substance from the suspension.

2. Process as claimed in claim 1 wherein the amount of said humic substance based on the total dry weight of said mixture and said humic substance is at least about 3 weight percent.

3. Process as claimed in claim 1 wherein the amount of said humic substance is about 3 to about 30 weight percent based on the total dry weight of said mixture and said humic substance.

4. Process as claimed in claim 1 wherein said mixture of granulatable fertilizer materials comprises a mixture of at least two materials selected from the class consisting of urea, inorganic nitrogen fertilizer materials, inorganic phosphorus fertilizer materials and inorganic potassium fertilizer materials.

5. Process as claimed in claim 1 wherein said mixture of granulatable fertilizer materials comprises urea, ammonium sulfate, monoammonium phosphate, calcium superphosphate, and potassium chloride.

6. Process as claimed in claim 1 wherein said mixture of granulatable fertilizer materials comprises urea, ammonium sulfate, monoammonium phosphate, and potassium sulfate.

7. Process as claimed in claim 1 wherein said mixture of granulatable fertilizer materials comprises ammonium sulfate, monoammonium phosphate, and potassium sulfate.

8. Process as claimed in claim 4 wherein said mixture of granulatable fertilizer materials also includes magnesium hydroxide.

9. Process as claimed in claim 5 wherein said mixture of granulatable fertilizer materials also includes magnesium hydroxide.

10. Process as claimed in claim 6 wherein said mixture of granulatable fertilizer materials also includes magnesium hydroxide.